Nov. 23, 1943. M. P. WINTHER 2,334,976
EDDY-CURRENT COUPLING
Filed April 16, 1942 3 Sheets-Sheet 3

Martin P. Winther,
Inventor.
Haynes and Koenig,
Attorneys.

Patented Nov. 23, 1943

2,334,976

UNITED STATES PATENT OFFICE 2,334,976

EDDY-CURRENT COUPLING

Martin P. Winther, Waukegan, Ill., assignor to Martin P. Winther, as trustee

Application April 16, 1942, Serial No. 439,205

15 Claims. (Cl. 172—284)

This invention relates to eddy-current couplings, and with regard to certain more specific features to couplings of this class which require water cooling.

Among the several objects of the invention may be noted the provision of an effective cooling arrangement particularly for large-sized couplings in which large amounts of power need to be dissipated at high slip rates; the provision of apparatus of the class described which will perform its functions per se at relatively high efficiency and without any substantial energy loss due to the use of the water; the provision of apparatus of the class described in which water is prevented from entering the inner portions of the machine and in which said inner portions may be additionally air-cooled; the provision of a multi-coil arrangement which will prevent the formation of undesirable magnetic circuits through the machine and which is conducive to efficient heat abstraction and also efficient use of copper in the coils; the provision of apparatus of the class described which is relatively quiet, and which if desired may be made dust- and explosion-proof. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal cross section of a coupling embodying the invention, being taken on line 1—1 of Fig. 2;

Fig. 4 is a detail section of an air vent.

Similar reference characters indicate corresponding parts throughout the several views of the drawings.

In the development of eddy-current couplings or clutches, it has been found that there are a number of uses for units of very large size where large powers need to be dissipated because of the high horsepower rating of the clutch and because it is desirable to slip the clutch for prolonged periods of time at high torques. Inasmuch as the problem of cooling such couplings or clutches entirely by the use of air is a difficult one, water cooling is preferable, and an improved method has been developed, as disclosed herein, for cooling such large rated machines by the use of water. A problem involved is that in apparatus of this class both the armature and the field rotate independently of each other, which introduces the necessity for preventing water from entering the inner portions of the machine, but without using packing glands that are impractical in apparatus of this nature. This is particularly desirable where additional air cooling is desired, as will appear.

Figure 1:
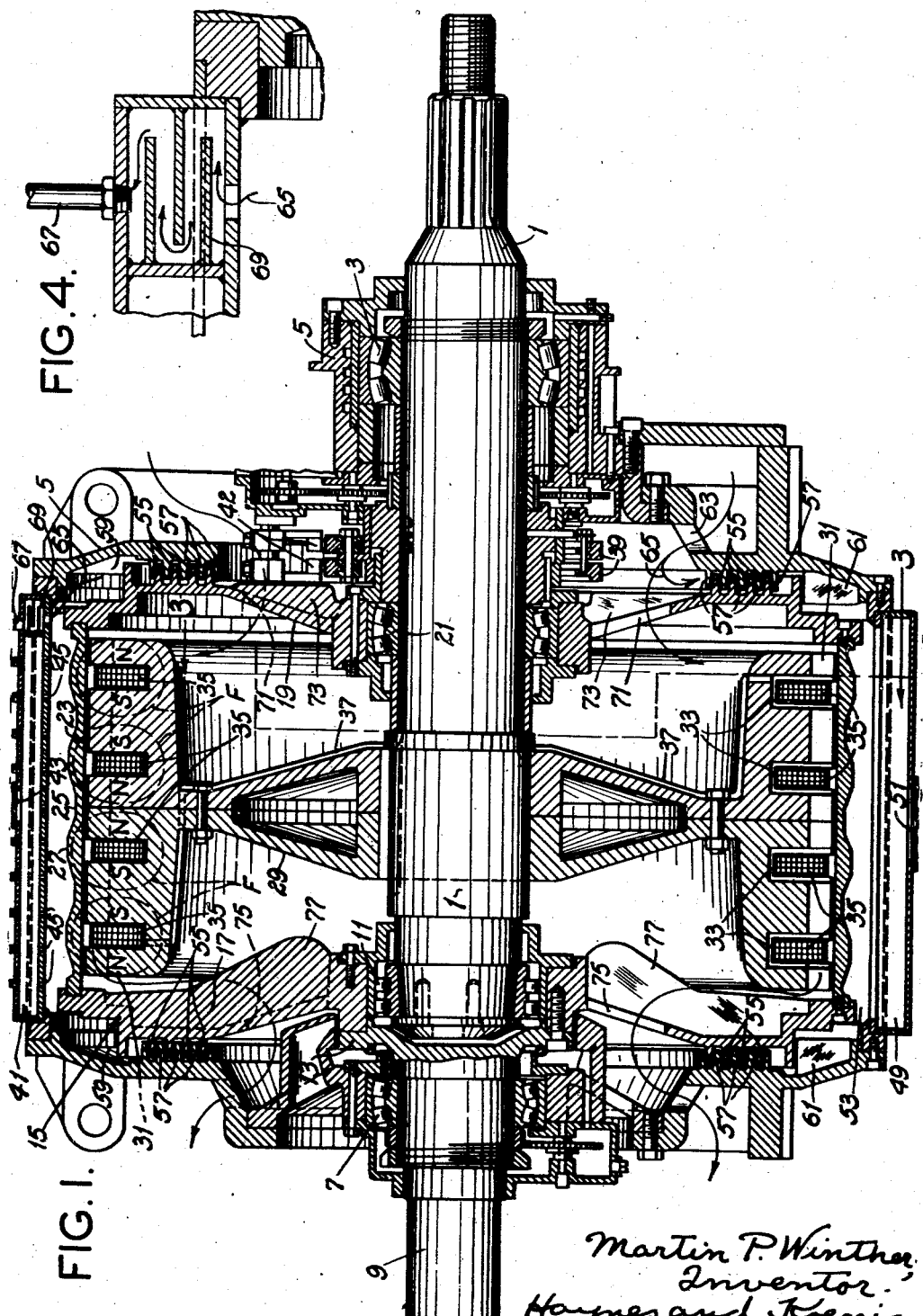
Figure 2:
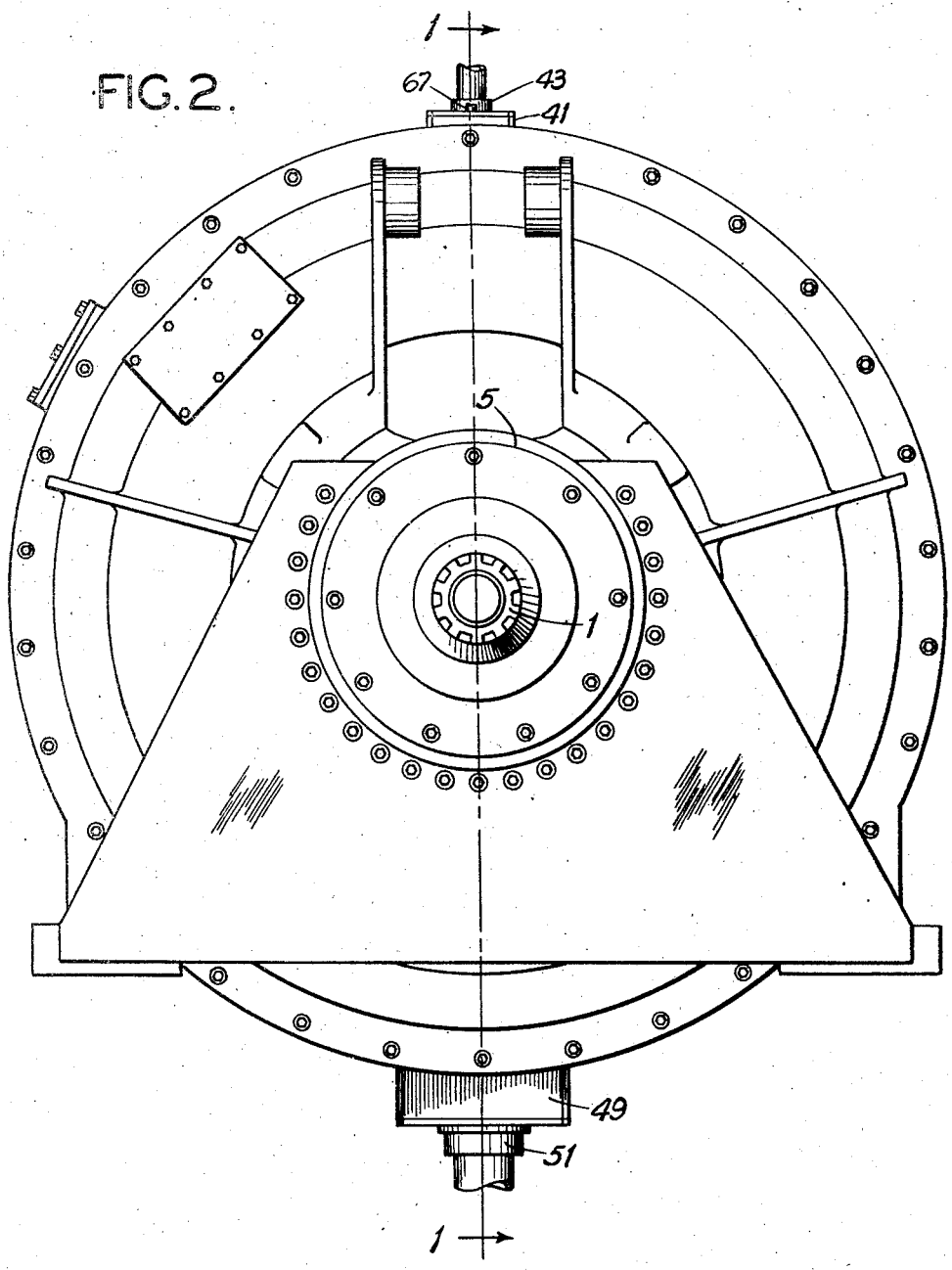
Fig. 2 is a right-end elevation of Fig. 1.

Referring now more particularly to Fig. 1, there is shown at numeral 1 the driven shaft of the present machine. This driven shaft 1 is supported in part by a bearing 3 in a stationary case 5.

The case 5 forms a frame and carries at its opposite end a bearing 7 in which is borne a drive shaft 9, to which is coupled the driver, usually an engine. Between the driven shaft 1 and the drive shaft 9 is a pilot bearing 11. The drive shaft 9 is flanged as shown at 13 for accommodating said pilot bearing 11 and also for attachment at the left end, of a hollow armature drum 15.

Reference character 15 shows the drum in general. In particular it consists of a left-hand head 17 (bolted to said flange 13) and a right-hand head 19, which is carried on a pilot bearing 21 on the mid-portion of the drive shaft 1. Between the heads 17 and 19 is a generally cylindric body portion 23 provided with peripheral depressions 25 and ridges 27. The inner surface of the cylinder 23 is cylindrically smooth and the ends of said cylinder 23 are fastened and hermetically sealed to the heads 17 and 19.

Keyed to the shaft 1, between the bearings 11 and 21, is a field member 29 which is rotary with said shaft 21. This field member 29 is formed with teeth 31 on its edge which are parallel to its axis. It is also peripherally grooved at four points, as indicated at 33, for the reception respectively of four peripherally wound electric coils 35. The coils are energized by means of a suitable circuit 37 closed between independent slip rings 39 carried on and with the shaft 1. The slip rings 39 are fed current from suitable brushes 42.

The purpose of the teeth 31 on the field member 29, as known, is to concentrate the respective toric flux fields of the coils 35 for obtaining optimum conditions of eddy current in the drum 15. In the present case these teeth also permit of the axial flow of air through the drum 15 and around the member 29, as will appear.

Although in most eddy-current clutches built during the early development of such equipment, it was customary to use a single coil. It has been found that, by using a number of coils and distributing the windings and the number of turns, an advantage is obtained in the speed of application of torque developed by the field produced by the coils, due to the reduction in inductance in the coils. For example, if all the coils are combined into one coil, the total number of turns in the one coil would produce a very high inductance, considering also that all the iron employed in the field magnetic circuit would have to be concentrated and associated with the single coil. By using a multiple coil system, as shown, the coils can be connected in parallel or even if they are connected in series, the higher voltage applied reduces the inductance and therefore the rate of time required to build up full flux in the circuit.

By the arrangement shown, it is possible to develop torque rapidly inasmuch as the development of torque is a function of the application of flux to the air gap. This feature is of considerable importance in a great many applications of the eddy-current clutch where rapidity of the application of the torque is desired. For example, applications have been encountered where a very large clutch, about 2000 H. P., required the application of full torque during a period of less than 3 seconds, and then a release of such torque was required over a period of 5 to 10 seconds. Ordinarily, if a single coil were used, the time required to built up the torque would be 6 or 7 seconds, against less than 1 second in the case of the multi-coil arrangement.

As stated, the coils 35 may be wired in series or in parallel, according to design requirements. The coils should be wound so that the surrounding toric fields indicated by the dotted lines F produce north and south polar conditions, such as indicated; that is, there should be similar polarities at opposite ends of the field member 29 so that there will not be a closed magnetic circuit through the heads 17, 19 and shaft 1. Magnetization of shaft 1 has undesirable effects, including a tendency to induce magnetism in connected equipment, and also a tendency to attract metal particles. By having equal polarities at opposite ends of the field 29, no magnetic circuit is closed through the shaft 1.

It will be seen that, with an even number of coils 35, the condition of similar polarities is obtained at the ends of the field member 29 and armature drum 15, while at the same time adjacent sides of adjacent coils have like polarities. It will be seen that, if an uneven number of coils were used and like polarities generated at the ends of the field member and armature drum, unlike polarities would exist between coils, and this is not as desirable as the even-numbered condition.

Also, this condition of an even number of coils preserves the toric flux field characteristics of each coil, since there is no bucking action between the flux therebetween. This makes desirable the wave form of the surface 25, 27 of the cylinder 23, with the high portions or ridges 27 opposite the coils.

The ridges 27 are opposite the coils 35 respectively, and the grooves 25 are between, so that, with a minimum weight in the inductive cylinder 23, a proper cross section is provided for flux passage. In other words, the undulations 25, 27 more or less follow the shapes or pattern of the toric flux fields generated by the coils 35.

At the same time, this ridged surface of the cylinder 23 is more conducive to spinning off water than would be a perfectly cylindric exterior surface on the cylinder 23; and cooling water is applied to this surface, as will be described.

Furthermore, the valley portions 25 of the undulations (between coils) bring cooling water as close as possible to the inner surface of cylinder 23. This reduces the average distance heat has to travel from the inner heat-generating regions of the cylinder 23.

The material of the field member 29 and of the cylinder 23 is magnetic, and that of the latter should be as inductive as possible, so that the eddy currents set up therein bring about a magnetic reaction with respect to the magnetic circuit around the coils 35 which causes the member 29 to be driven by the drum 15, thus electrically coupling the shafts 1 and 9. The amount of rotary slip between the shafts 1 and 9 will depend upon the degree of energization of the coils 35. This is accompanied by heating which increases as the slip increases.

To carry off the heat engendered in the cylinder 23, water cooling is desirable because of its high specific heat, compared to gaseous mediums such as air. On the other hand, to surround the cylinder 23 solidly with water is conducive to undesirable energy loss because of friction and churning, and is also conducive to leakage inward, which cannot easily be controlled at the open bearing 21, for example. Besides if air cooling of the field member 29 is desired, it would be difficult to have the air traverse the centrally located water. An important part of the present invention therefore comprises the elimination of these difficulties.

To effect water cooling, there is provided longitudinally across the top of the frame 5 a water box or manifold 41 having a water inlet 43, and along the base a plurality of small water outlets 45. These water outlets 45 each provide a water spray upon the surface of the cylinder 23. The rate at which water is sprayed upon this surface is not enough to fill the space between the drum 15 and the stationary case 5. In fact, the amount of water is relatively small and it is centrifugally flung off from the surface 25, 27 against the inside of the case 5.

Figure 3:
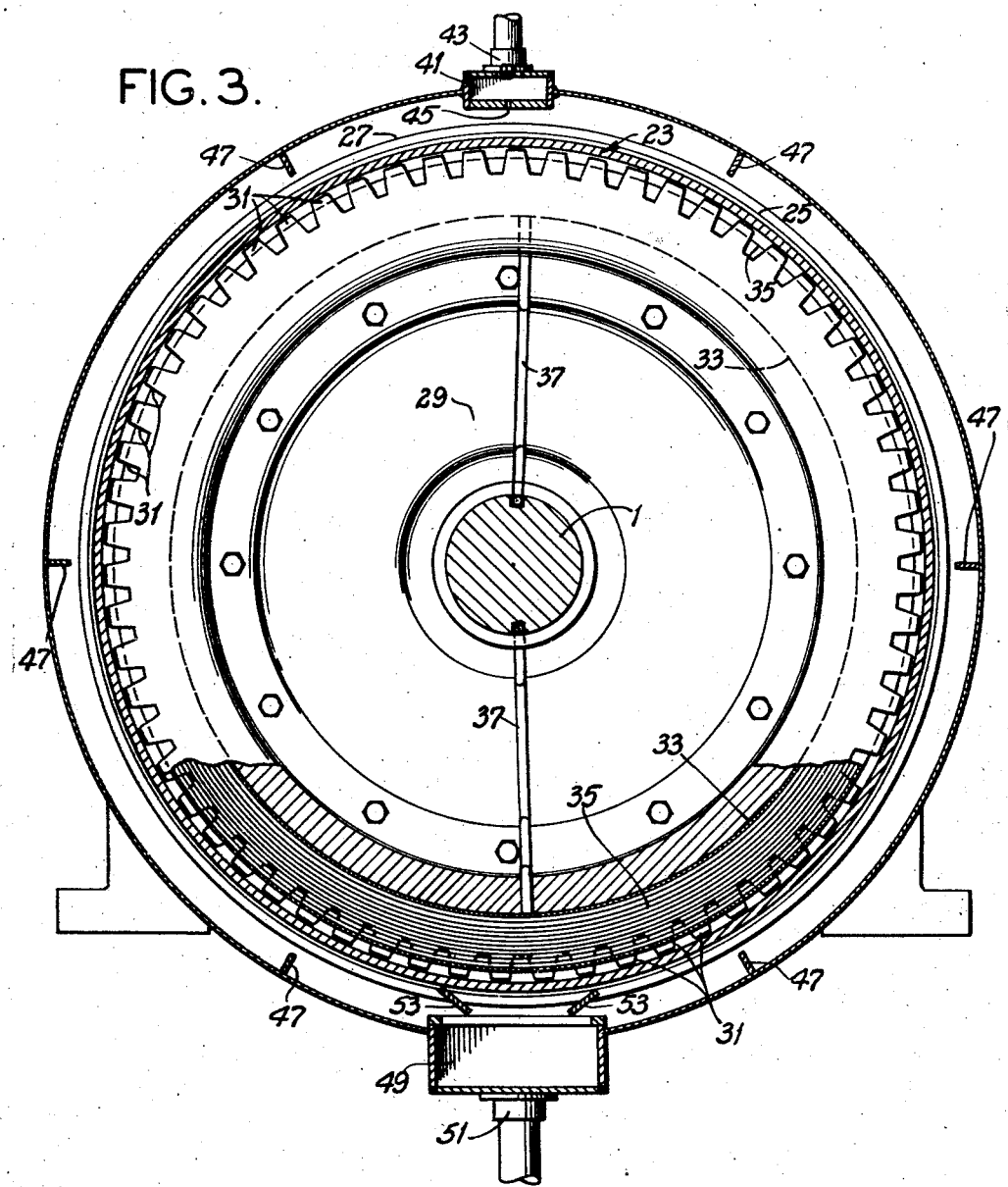
Fig. 3 is a vertical section taken on line 3—3 of Fig. 1.

The inside of the enclosing case 5 is baffled at intervals, as indicated at 47 (Fig. 3), from which the water deflects back upon the rotating surface 25, 27. Thus the water is alternately moved from the surface 25, 27 against the inner surface of 5, back and forth continuously, scrubbing as it goes, until it reaches the bottom of the case 5. The ridges 27 aid in whipping the water from the drum. At the bottom of the case is a water-receiving manifold 49, longitudinally arranged and having an outlet 51 from which the warm water flows by gravity.

In order that water may not by-pass the drain manifold 49, deflectors 53 are provided. These are oppositely sloped so that one or the other is effective, regardless of the direction of rotation of cylinder 23.

From the above it will be seen that the space between the drum 15 and the case 5 is not filled with water, but that it is primarily filled with air and the water simply forms a spray or scrubbing stream, the volume of which constitutes only a small part of the total volume of the chamber between the parts 15 and 5. For example, the volume of water is of the order of 5 to 10% of the total volume between the drum 15 and case 5 down to certain labyrinth seals 55, 57 which will be mentioned.

In order that parts of the spray water may not be forced inward, an unpacked labyrinth is formed at each end of the drum 15 by means of the tapered bead rings 55 interspaced between stationary tapered bead rings 57 on the case 5. Thus if any spray water seeks to pass inward, it is either promptly flung off centrifugally in a radial direction, or if it enters a labyrinth it is caught and feeds out over the tapers.

Since there is some tendency to form rings of water in the end regions 59 of the case 5, there are provided at the peripheries of these regions 59 baffles 61 which break up this ring and cause it to flow out through lower manifold 49.

Another point in regard to the labyrinths 55, 57 is that they tend to pump air radially, the air entering at openings such as shown at 63 (see the arrow 65). To relieve resulting internal air pressure, I use a vent 67, in the water supply box 41, baffled as indicated at 69 (Fig. 4).

The above provides for water-cooling the drum 15 substantially to absorb heat engendered by the eddy-current effects in the drum. However, since the drum in any event runs warm, it tends to radiate heat inward against the coils 35 and the member 29. This radiated heat should be conducted away from member 29, although its amount is not of the high order of the heat involved in the drum 15. It is practicable to carry off this heat with air. Air circulation within the drum 15 and around field member 29 is accomplished by providing inlet openings 71 in the head 19, and adjacent to these openings are outer fan blades 73. The blades draw in air through the openings 63 in the case 5 and push it through the inlet openings 71 to the interior of the drum 15. This air is forced radially, as indicated by the arrow, thence longitudinally around the teeth 31 and outside of the coils 35. When it reaches the head 17 it flows inwardly and is pumped out through openings 75 in said head 17 by means of inner fan blades 77, formed within said head 17. This air circulation provides ample cooling effect for the interior radiation, thus protecting the field member. At the same time, the interior of the machine including the coils 35 is not subjected to any harmful effect of water, which is confined to cooling the outside of the drum 15.

Advantages of the invention are as follows:

The relatively small calculated amount of water used (just enough to carry off the heat), as compared to the old methods of using an excessive over-supply of liquid coolant mass, avoids dynamometer losses due to friction. In addition, the free space allows the relatively small amount of water to be thrown back and forth from the armature drum to the case with a rapid action and impact, which brings about a very desirable scrubbing action which removes so-called stagnant film that ordinarily interferes with high rates of heat transmission. By breaking up this stagnant film, a higher heat transmission may be effected with less water. Not only are the surfaces scrubbed so as to remove the stagnant film, but a given mass of water functions several times in its movements back and forth between the surfaces of the drum 15 and case 5, thus making most efficient use of the very small amount of water.

In addition, this particular manner of using a small amount of water in a relatively large space in a kinetic centrifugal fashion, rather than under more or less static pressure, solves the problem of preventing water from entering bearings such as 21, and getting into the inside of the machine. In other words, it is easier to centrifugally hold off from a bearing such as 21 by means of glands such as 55, 57, the small amounts of spray water involved; than it is to provide positive packing means against a solid volume of water under static pressure. This is in addition to the point that such a solid mass of water engenders internal friction of turbulence which the spray water does not.

Furthermore, without tight packing means air may be brought through the case 5 and drum 15 to circulate between the drum 15 and the field 29 as described, for overcoming the radiant effects on the armature. This could not be so readily accomplished if the problem needed to be faced of handling a solid volume of water between the drum 15 and the case 5. Also inflow of external air at 55, 57 aids in preventing outflow of water.

Regarding the dynamometer effect of any solid mass of water between the drum 15 and the case 5, it may be appreciated that if the quantity of this water were appreciable the drum would be rotating in a cylinder of water, which it would tend to carry with it, and thus a great amount of power would be lost in the coupling. This is undesirable and the present invention avoids it.

The present machine also has advantages over machines in which air is alone depended upon for cooling the outside of the drum 15. With such machines, the rate of air movement needs to be so large and it needs to be so vigorous that excessive noise is ordinarily produced. This is not true of the present machine.

It may be added that in the case of small designs of the present machine the interior air ventilation around member 29 may not be necessary. Thus the air vents 71 and 75 may be closed up, the fan blades 23 and 77 eliminated and the labyrinths 55, 57 fitted closer. In such cases the use of the spray cooling herein disclosed permits of manufacturing a dust-proof and explosion-proof machine, where needed. At the same time the machine does not have the disadvantages of the losses engendered by using large solid masses of water between the rotating parts and the case.

It will be seen that, where internal air circulation is used, the hollow armature drum acts as a conduit within which is the field member, and that the fan members 23 and 77 act to draw air axially through openings 71, 75 in the ends of the drum. At the same time, the member 29 is itself formed as a diaphragm in the conduit which prevents air from by-passing straight through the drum and spreads it out to circulate between the edges of member 29 and the drum 23.

It is clear that, although the shaft 9 is shown as a driver and shaft 1 as a driven member, in some applications where the driven speed is not too low, the shaft 1 may be the driver and the shaft 9 the driven member. Otherwise the action will be analogous to that described above.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In an electrical slip coupling, an enclosing case, a relatively movable armature drum within the case, a relatively movable field member within said armature drum, means for providing a flux field interlinking the field member and the armature drum whereby eddy currents are engendered in the latter to heat the same, means for spraying water against the outside of the drum in the space between it and the case, packless labyrinth means between the ends of the inductor drum and the case adapted centrifugally to throw outwardly any inwardly directed water, said case having an outlet for said water, the volume of water between the drum and the case at any instant being substantially less than the volume between said drum, the case and the labyrinth means, said case having axial openings communicating with the labyrinth means whereby radial flow of air is induced through said labyrinth means, a relief means in said case for preventing air pressure from building up excessively from the inflow of air through the labyrinth means, said drum having axial openings, and bladed means associated with said openings for pumping air through the drum and around said field member, said air passing into and out of said case through the openings therein, said air flow being axial through the drum.

2. In an electrical slip coupling, an enclosing case, a relatively movable armature drum within the case, a relatively movable field member within said drum, means for providing a flux field interlinking the field member and the drum whereby eddy currents are engendered in the latter and heat the same, means for spraying water against the outside of the drum in the space between it and the case, said case having an outlet for said water, and water-deflecting means on the inner surface of said case for directing back to the drum any water thrown therefrom centrifugally.

3. In an electrical slip coupling, an enclosing case, a relatively movable and ridged armature drum within the case, a relatively movable field member within said drum, means for providing a flux field interlinking the field member and the drum whereby eddy currents are engendered in the latter and heat the same, means for spraying a limited amount of water against the outside of the drum in the space between it and the case, said case having an outlet for said water, and water-deflecting means on the inner surface of said case for directing back to the drum any water thrown centrifugally from its ridges.

4. In an electromagnetic slip coupling, a rotary field member, spaced flux-forming coils formed around said field member, an armature drum surrounding said field member, each of said coils forming a toric flux field interlinking the field member and the drum, connections for causing the current in said coils to flow in a direction such that the toric flux field around the two endwise coils produces like polarities at the ends of said field member and the drum, and whereby the polarities between adjacent sides of adjacent coils are the same, the number of coils being even, said armature drum having alternate peripheral ridged and hollow portions on its exterior surface, the ridged portions being opposite the respective coils in the adjacent field member and the hollow portions therebetween.

5. In an electromagnetic slip coupling, a rotary field member, spaced flux-forming coils formed around said member, an armature drum surrounding said field member, each of said coils forming an individual toric flux field interlinking the field member and the drum, said drum having alternate peripheral ridged and hollow portions on its exterior surface, the ridged portions being opposite the respective coils in the adjacent field member.

6. In an electromagnetic slip coupling, a rotary field member, spaced flux-forming coils formed around said field member, an armature drum surrounding said field member, each of said coils forming an individual toric flux field interlinking the field member and the drum, said drum having alternate peripheral ridged and hollow portions on its exterior surface, the ridged portions being opposite the respective coils in the adjacent field member, and means for spraying water on the exterior of said drum to be spun off from said ridged portions.

7. In an electromagnetic coupling, an enclosing case, a rotary hollow armature drum, a rotary field member within said drum, spaced peripheral field coils at the edge of the field member, means for energizing said coils to provide toric flux fields interlinking the field member and the drum, said drum having external ridges adjacent the respective field coils on the field member with depressions therebetween, and means associated with the case for spraying liquid upon the ridged surface of said drum without filling the space between the drum and the case with said liquid.

8. In an electromagnetic coupling, an enclosing case, a rotary hollow armature drum, a rotary field member within said drum, spaced peripheral field coils at the edge of the field member, means for energizing said coils to provide toric flux fields interlinking the field member and the drum, said drum having external ridges adjacent the respective field coils on the field member with depressions therebetween, and means associated with the case for spraying liquid upon the ridged surface of said drum without filling the space between the drum and the case with said liquid, the current in said field coils being such that the endwise polarity of the field member and drum are the same.

9. In an electromagnetic coupling, an enclosing case, a rotary hollow armature drum, a rotary field member within said drum, spaced peripheral field coils at the edge of the field member, means for energizing said coils to provide toric flux fields interlinking the field member and the armature drum, said drum having external ridges adjacent the respective field coils on the field member with depressions therebetween, and means associated with the case for spraying liquid upon the ridged surface of said drum without filling the space between the drum and the case with said liquid, connections causing the current in said field coils being such that the endwise polarity of the field member and drum are the same, and causing the same polarity to exist between adjacent surfaces of adjacent coils, the number of coils being even.

10. In an electrical slip coupling, an enclosing case, a relatively movable armature drum within the case, a relatively movable field member within said armature drum, means for providing a flux field interlinking the field member and the armature drum whereby eddy currents are engendered in the latter to heat the same, means for spraying water against the outside of the drum in the space between it and the case, annular packless labyrinth means between the ends of the inductor drum and the case adapted centrifugally to throw outwardly any inwardly directed water; said case having an outlet for said water, the volume of water between the drum and the case at any instant being substantially less than the volume between said drum, the case and the labyrinth means; said case and drum having openings arranged within the labyrinth means, and bladed means associated with said openings for pumping air through the drum and around said field member, said air passing into and out of said case through the openings therein and axially through the drum.

11. In an electrical slip coupling, an enclosing case, a relatively movable, water-cooled armature drum within the case, annular labyrinth packing means between the drum and case, a relatively movable field member within said armature drum, means for providing a flux field interlinking the field member and the armature drum whereby eddy currents are engendered in the latter to heat the same, the peripheral surface of the field member being recessed to provide flux concentrating means and intermediate spaces for air flow, said case and drum having axial openings within the periphery of the packing means, and bladed means associated with the said opening in the drum for pumping air through the case and the drum and around said field member, the field member being mounted so as substantially to form an air-blocking diaphragm across the drum and forcing said flow to take place first radially outward from within one packing to the periphery of the field member, then axially between the recessed periphery of the field member and the drum, and finally radially inward and out through the other packing means.

12. In an electrical slip coupling, an enclosing case, a relatively movable armature drum within the case, a relatively movable field member within said armature drum, means for providing a flux field interlinking the field member and the armature drum whereby eddy currents are engendered in the latter to heat the same, said drum having axial openings, and bladed means associated with said openings for pumping air through the drum and around said field member, said air passing into and out of said case through the openings therein, said air flow being through the drum, the field member being mounted so as substantially to form an air-blocking diaphragm and forcing said axial flow to take place between the periphery of the field member and the drum.

13. In an electromagnetic slip coupling, a rotary field member, spaced flux-forming coils formed around said member, an armature drum surrounding said field member, electric connections to said coils whereby individual toric flux fields are formed interlinking the field member and the drum with like polarities of magnetic flux between adjacent coil parts, said drum having alternate peripheral heavier and lighter portions on its exterior surface, the heavier portions being substantially in the planes of said coils of the field member and the lighter portions being substantially between the planes between the coils.

14. In an electromagnetic slip coupling, a rotary field member, spaced flux-forming coils formed around said member, a rotary armature drum surrounding said field member, electric connections to said coils whereby individual toric flux fields are formed interlinking the field member and the drum with like polarities of magnetic flux between adjacent coil parts, said drum externally having alternate peripheral heavier ridges and lighter peripheral valleys, the ridges being substantially in the planes of said coils of the field member and the valley portions being substantially in the planes between the coils, and means for supplying water on the exterior of the drum, said ridges and valleys functioning electrically to form an adequate flux path without excess thicknesses for the purpose and the ridges under rotation being adapted to spin off water from the drum.

15. In an electromagnetic slip coupling, a rotary field member, spaced flux-forming coils formed around said member, a rotary armature drum surrounding said field member, electric connections to said coils whereby individual toric flux fields are formed interlinking the field member and the drum with like polarities of magnetic flux between adjacent coil parts, whereby a magnetic field is formed in the drum having an externally cylindric ridged pattern, said drum having a basic externally spaced peripheral ridge and groove form substantially following the pattern engendered by said magnetic field.

MARTIN P. WINTHER.